(12) United States Patent
Murdock et al.

(10) Patent No.: US 8,478,701 B2
(45) Date of Patent: Jul. 2, 2013

(54) LOCATING A USER BASED ON AGGREGATED TWEET CONTENT ASSOCIATED WITH A LOCATION

(75) Inventors: Vanessa Murdock, Barcelona (ES); Sheila Kinsella, Sligo (IE)

(73) Assignee: Yahoo! Inc., Sunnyvale, CA (US)

( * ) Notice: Subject to any disclaimer, the term of this patent is extended or adjusted under 35 U.S.C. 154(b) by 371 days.

(21) Appl. No.: 12/975,386

(22) Filed: Dec. 22, 2010

(65) Prior Publication Data

US 2012/0166367 A1    Jun. 28, 2012

(51) Int. Cl.
*G06N 5/00*    (2006.01)
(52) U.S. Cl.
USPC .............................................. 706/12; 706/45

(58) Field of Classification Search
USPC ..................................................... 706/12, 45
See application file for complete search history.

(56) References Cited

PUBLICATIONS

Cheng, You Are Where You Tweet: A Content-Based Approach to Geo-locating Twitter Users, Proceedings of the 19th ACM international conference on Information and knowledge management, 2010, pp. 759-768.*

* cited by examiner

*Primary Examiner* — Wilbert L Starks
(74) *Attorney, Agent, or Firm* — Evergreen Valley Law Group, P.C.; Kanika Radhakrishnan (57) ABSTRACT

A user submitting a query from a computer at an unknown location is located using a language model. The language model is derived from an aggregation of tweets that were sent from known locations.

20 Claims, 11 Drawing Sheets

| Location | Probability Score |
|---|---|
| Taj Mahal | 0.156 |
| United States | 0.566 |
| London | 0.834 |

LOCATING A USER BASED ON AGGREGATED TWEET CONTENT ASSOCIATED WITH A LOCATION

BACKGROUND

1. Technical Field

Embodiments of the invention relate generally, to the field of computers, and more specifically, to locating a user based on tweet content associated with a location.

2. Prior Art

There is a rise in social networking and micro blogging services, such as Twitter. Millions of users post short messages ("tweets") to other users of a computer network at different geographical locations. Further, mobile devices allow users to microblog their thoughts about from their current location. For example, a hockey fan at the HP Arena in San Jose, Calif. might create a tweet stating "The Sharks just scored again!" Some tweet metadata includes geotags which identify a location from which a tweet originated.

Advertisers and others seek information about a geographical location of a computer user for various reasons such as targeted advertising and location-based services. An existing technique obtains a user location by determining an IP (Internet Protocol) address. However, IP addresses are unreliable due to masking from VPNs (Virtual Private Networks) and the use of dynamic IP addresses by ISPs (Internet Service Provider) such as AOL (America OnLine). Further, the granularity of location information from an IP address is often not specific enough. Hence, prediction of the location of the user is not accurate in current techniques.

In light of the foregoing discussion, there is a need for a robust method, computer program product and system for locating a user based on a language model built from tweet content associated with a location.

SUMMARY

The above-mentioned needs are met with a method, a computer program product, and system for locating a user at an unknown location using a language model. The language model is derived from an aggregation of tweets that were sent from known locations.

An example of a computer-implemented method for locating a user based on aggregated tweets associated with a location includes the step of aggregating a plurality of tweets from a plurality of users at a plurality of known locations. The method also includes the step of grouping microblog content of tweets sent from a common location and receiving query content from a user at an unknown location. Also, the method includes the step of estimating the unknown location from the plurality of known locations. Furthermore, the method includes outputting the estimated location.

An example of a computer program product stored on a non-transitory computer-readable medium that when executed by a processor, performs a method for locating a user based on tweets associated with a location that includes the step of aggregating a plurality of tweets from a plurality of users at a plurality of known locations. The method also includes the step of grouping microblog content of tweets sent from a common location and receiving query content from a user at an unknown location. Further, the method includes the step of estimating the unknown location from the plurality of known locations. Additionally, the method includes the step of outputting the estimated location.

An example of a system to locate a user based on tweet content associated with a location includes a tweet database. Further, the system includes a tweet training module coupled in communication with the tweet database to aggregate a plurality of tweets. Moreover, the system includes a tweet query module coupled in communication with the tweet database to receive query content from a user at an unknown location.

Advantageously, robust location-based services can be provided to a user.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION OF THE EMBODIMENTS

A method, computer program product and a system for locating a user at an unknown location from a language model is disclosed. The language model derived from an aggregation of tweets that were sent from known locations. The following detailed description is intended to provide example implementations to one of ordinary skill in the art, and is not intended to limit the invention to the explicit disclosure, as one of ordinary skill in the art will understand that variations can be substituted that are within the scope of the invention as described.

Figure 1:
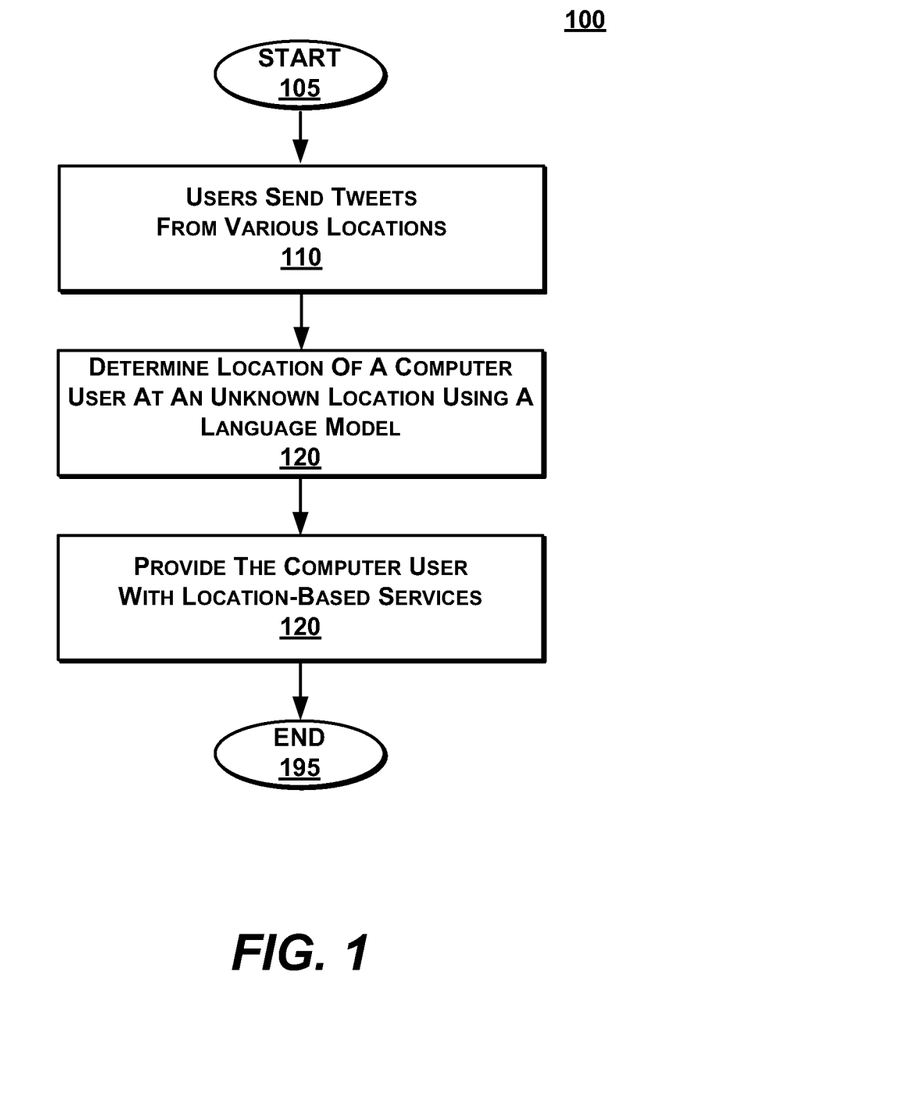
FIG. 1 is a flow chart illustrating a method for providing location-based content to a computer user according to one embodiment.

FIG. 1 is a flow chart illustrating a method 100 for providing location-based content to a computer user according to one embodiment.

At step 110, users send tweets from various known locations. In some embodiments, a geotag is included in metadata associated with the tweet. The geotag describes a location that the tweet was sent from. Location information can be acquired from GPS (Global Positioning System) coordinates, or other location technologies embedded in a computing device. In some embodiments, some tweets are sent without geotags as well.

More generally, tweets include tweet content created by a user of a computer device. The tweet content is of unlimited length, a fixed length (e.g., SMS is limited to 160-characters), or just a few characters. A user can tweet about anything. A tweet, in one embodiment, is a text-based user message comprising up to 140 characters (including spaces, characters in text and hyperlinks). The computing device used to send tweets can be a mobile type of computer (e.g., a smart phone) or a stationary one (e.g., a personal computer). Some tweet content is affected by a user's current location when sent from the computing device.

Prior to sending tweets, a user registers with a microblog service such as Twitter using the web site located at http://www.twitter.com. The user downloads and installs a client on a computing device (e.g., a laptop).

Further, a first twitter user may choose to follow a second twitter user. The second twitter user's tweets now appear on a web page used by the first twitter user. If the first twitter user chooses to follow twenty other twitter users, then the first twitter user can view the tweets of all the twenty twitter users. Twitters follow syntax. Users can post tweets with a topic, event or annotation by use of hash tags—words or phrases prefixed with a #, for example #twitter. Similarly, the letter "d" followed by a username allows users to send messages. The @ sign followed by a username is used for replying to other users, for example, @Robin.

In one example, while using the computing device from a hockey game at the HP Arena in San Joe, Calif., tweeter 105a types a remark into the twitter client—"Sharks just scored again!!!" The client connects with a twitter server which stores and distributes the message to followers of tweeter. The tweet may also be available to the public from the twitter server.

As used herein, a tweet is merely an exemplary type of microblog, although the two terms are sometimes used interchangeably. Other types of microblog content are possible, such as SMS (Short Message System) or MMS (Multimedia Message System) messages, instant messages, status posts, and the like. In other embodiments, a language model can also be derived from status updates to a Facebook profile, or any combination of the above microblog types, for use as described herein. Microblog content consists of a short message, an image or embedded video. Coordinates signifies a longitude and latitude. The following description uses tweets as a specific example of message content that includes location information. However, the present invention is not limited to tweets.

At step 120, a location of a computer user at an unknown location is determined using a language model. The language model is derived from tweet content and geotags. Further details and embodiments of step 120 are described below.

At step 130, the computer user is provided with content based on the determined location. The location-based information can be provided at various levels of granularity, such as country, state, city, zip code level, neighborhood, a point of interest, a province, a grid location, or any arbitrary boundary.

In one implementation, the determined location is used for targeted advertisements. An ad server uses the determined location to search an ad database for related advertisements. Additional information can be used for ad selection, such as the same search query used to determine the unknown location. In one example, a general advertisement for a chain restaurant can be augmented with an address and map of the closest restaurant.

In other embodiments, location-based services can include filtering search results of the query based on a location, points of interest, local weather information, and the like.

Figure 2:
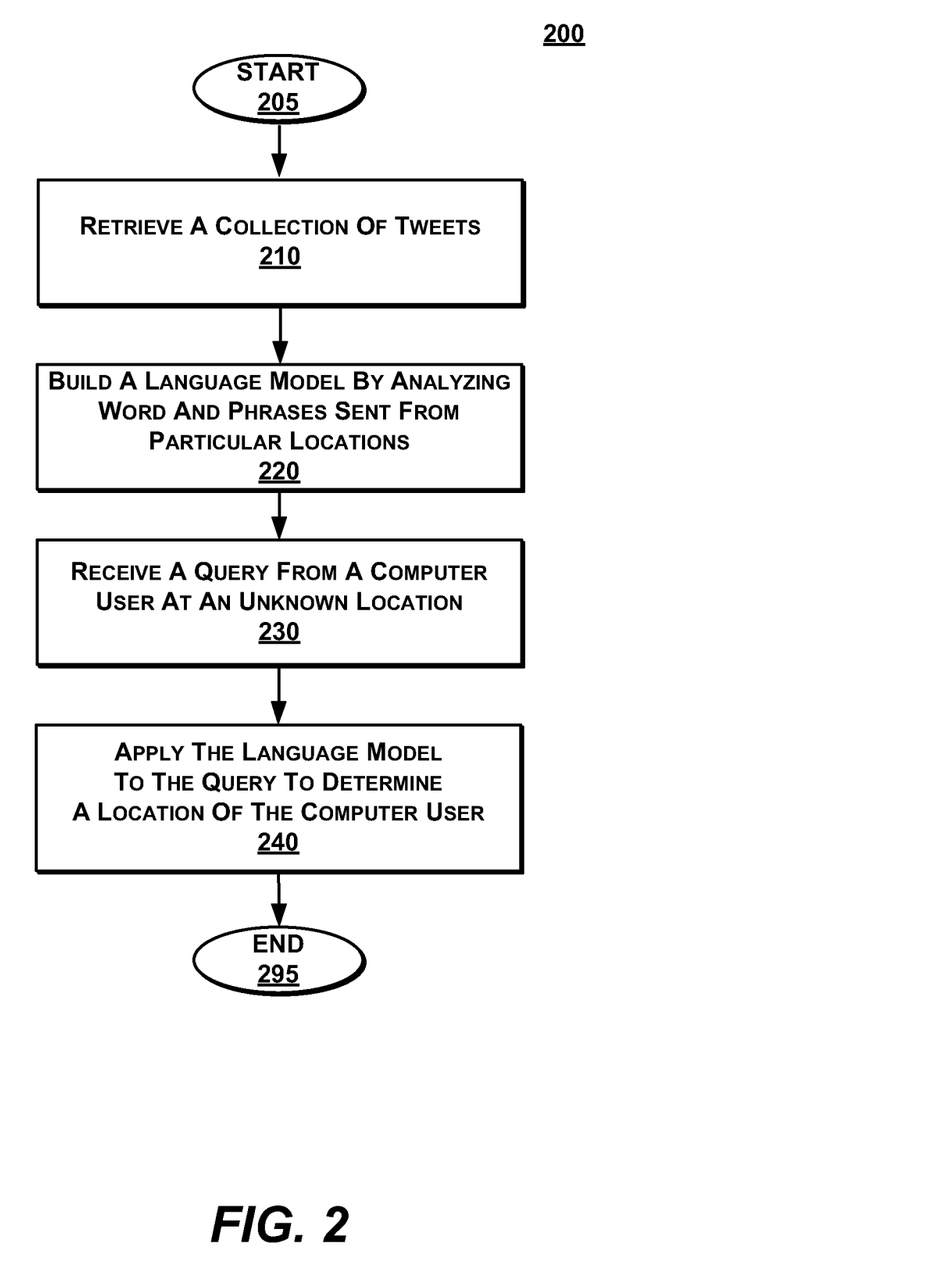
FIG. 2 is a flow chart illustrating a method for determining a location of the computer user using a language model according to one embodiment.

FIG. 2 is a flow chart illustrating a method 200 for determining a location of the computer user using a language model according to one embodiment. The method 200 is one exemplary implementation of step 120 of FIG. 1.

At step 210, a collection of tweets is retrieved. Tweets are retrieved by a variety of techniques. In one embodiment, public tweets can be found by crawling a web site for twitter services, by submitting queries to a search engine, by intercepting tweet messages. In another embodiment, APIs (Application Programming Interfaces) provided by a twitter service can be use to update the database either in batch mode or tweet-by-tweet. In still another embodiment, tweets can be purchased through a commercial relationship with a cell phone provider or an ISP (Internet Service Provider).

At step 220, a language model is built by analyzing words and phrases sent from particular locations. Tweets of different locations (different levels of country, state, city, zip code level, neighborhood, a point of interest, a province, a grid location, or any arbitrary boundary) are used to build a language model for various locations. For example, tweets from the neighbors of Coney Island, Lower Manhattan and Harlem are included in the language model for New York City. Language models of the locations are created using coordinates extracted from geotagged Twitter data. The accuracy of the models is used to predict the location of an individual tweet and the location of the user. Further details on building the language model are discussed below.

At step 230, a computer user at an unknown location submits a query. The query can be a search query submitted to a search engine, personal data provided in a form, a status update to a social networking type, or any other type of information submitted by the computer user. Generally, the query includes a string of text input by a keyboard, voice command, mouse strokes, or the like.

In one embodiment, the query comes from a combination of sources. In another embodiment, a first query is used to determine a first location, and a second query is used to improve the location accuracy. In yet another embodiment, a user moves after the first location is determined, so a second query is used to determine a second location.

At step 240, the language model is applied to the query to determine a location of the computer user at the unknown location. For example, a user at an unknown location can send a query that includes for example Taj Mahal. The tweet database is searched to predict the location associated with the query. The query is compared to the microblog content to predict a certain common location associated with the unknown location. As a result of the single query, a user may be located in the country of India, in the state of Uttar Pradesh, in the city of Agra, and proximate to State Highway 62, among other location information. In one embodiment, subsequent queries from the user can be used to further refine or adjust the location.

In one embodiment the location may already be known in very general terms using other techniques, but will be defined with more accuracy by using the language model. Step 120 is discussed in greater detail below in association with FIG. 4.

Figure 3:
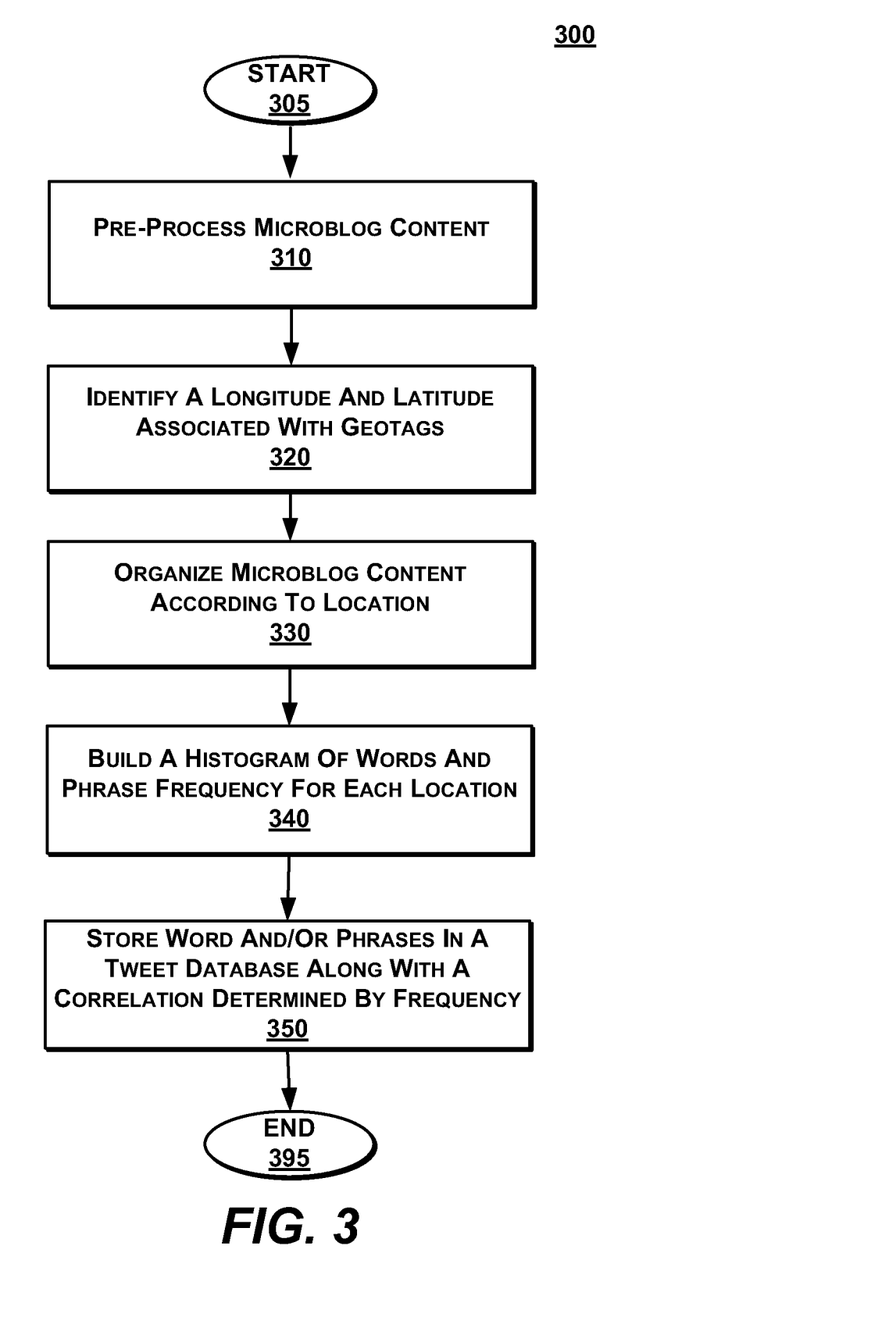
FIG. 3 is a flow diagram illustrating a method for building a language model by analyzing words and phrases sent from various locations according to one embodiment of the present invention.

FIG. 3 is a flow diagram illustrating a method 300 for building a language model by analyzing words and phrases sent from various locations according to one embodiment of the present invention. The method 300 is one exemplary implementation of step 220 of FIG. 2.

At step 310, microblog content can be pre-processed using implementation-specific technique. In one embodiment, tweets are filtered to eliminate those with no content value (e.g., a tweet of just "LOL"). In another embodiment, parts of a tweet are filtered to extract relevant words or phrases. For example, @ and # symbols can be removed. In general, tweets are pre-processed for more efficient processing by the analysis tools.

At step 320, a longitude and latitude associated with geotags of the microblog content are identified. Other types of location information are possible, such as city, region and/or country information.

At step 330, microblog content is organized according to location. The longitude and latitude information provides details of a common location at various levels of country, state, city and zip code. In one embodiment, the microblog content can be grouped by country, state, city and zip code derived from the longitude and latitude. In another embodiment, landmarks or points of interest can be derived from the longitude and latitude for grouping the microblog content. One other embodiment groups microblog content according to a grid.

At step 340, a histogram of word or phrase frequency is built for each location. Generally, a histogram is a graphical representation of tabulated frequencies, showing what proportion of cases fall into each category of several categories. The categories, or bins, are spread along an X-axis of the histogram. The Y-axis of the histogram represents the frequency of data for each bin, or in the present case, the number of occurrences for each word or frequency.

At step 350, for each location, words and/or phrases are stored in a database along with a correlation as determined by frequency. Some words or phrases have a higher frequency for a particular location. For example, tweets from the Statue of Liberty would have a high frequency of words and phrases such as New York, New York Harbor, torch, France, copper, and beautiful. Some embodiments set a threshold frequency for more efficiency. Also, some words or phrases have a high frequency at several locations. For example, the phrase New York would also show up in tweets from JFK airport, the Empire State building, or Times Square. Thus, as described below, one or more correlations are used to rank potential locations.

In an alternative embodiment, microblog content is organized according to word and phrases. Accordingly, a histogram of locations is generated for each word or phrase.

Figure 4:
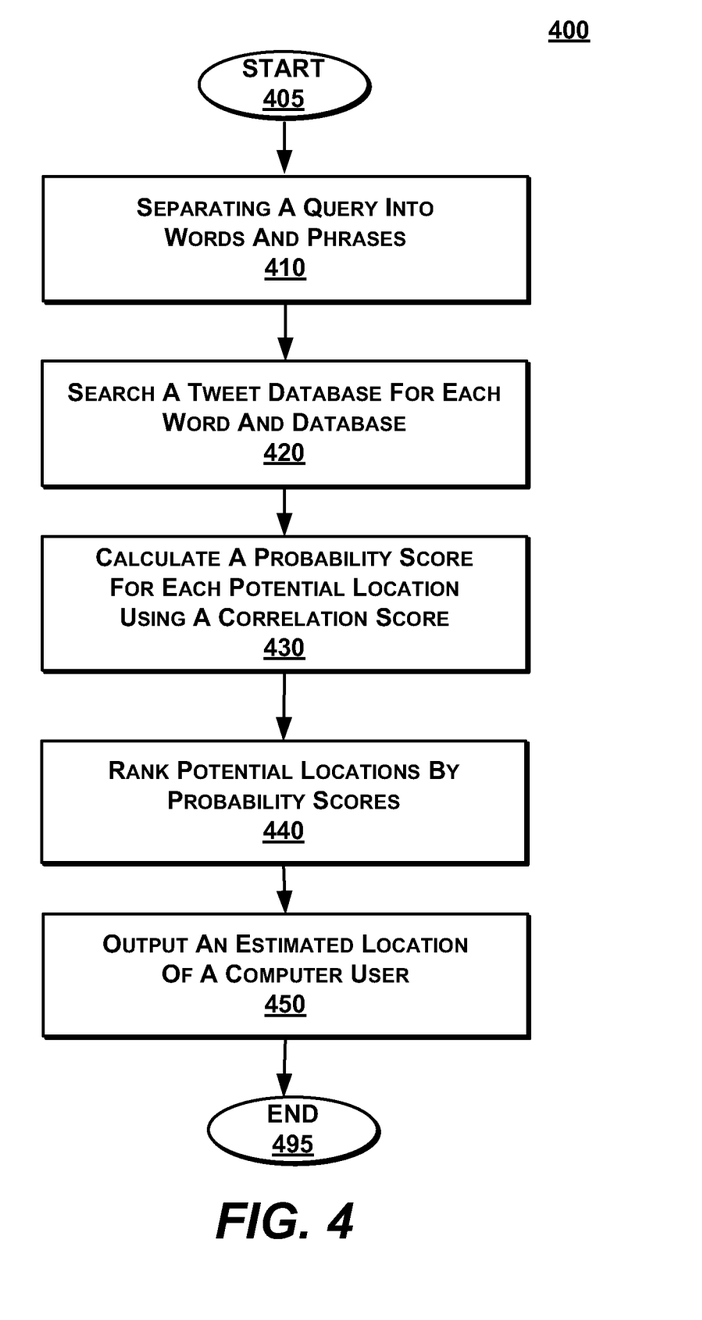
FIG. 4 is a flow diagram illustrating a method 400 for applying a language model to a query to determine a location of a computer user at the unknown location according to one embodiment.

FIG. 4 is a flow diagram illustrating a method 400 for applying a language model to a query to determine a location of a computer user at the unknown location according to one embodiment. The method 400 is an exemplary implementation of step 240 of FIG. 2.

At step 410, a query is separated into words and phrases. Some phrases can be explicitly identified. For example, a form entry for city may have an associated HTML (Hyper-Text Markup Language) header tag that indicates the type of data as a city. In this case the words Los and Angeles are clearly identified as the phrase Los Angeles. Other phrases can be implied. For example, a dictionary of common phrases can be consulted to identify vernaculars such as good bye. Phrases may also be identified as sets of commonly co-occurring terms. For example, the word "York" is very frequently preceded by the word "New" implying that if the two words happen to co-occur in the document, they are to be considered a phrase.

At step 420, the words and phrases are each separately searched. A list of potential locations for each search is generated, along with an accompanying correlation score derived from the histogram. At least some locations are likely to appear for more than one of the words or phrases.

For example, consider a query Taj Mahal and the microblog content: Taj Mahal, beautiful, marble, India, wonder, Agra, Shah Jahan and wife. As there is a match for the query Taj Mahal with the microblog content, the coordinates from the microblog content are obtained as a potential location to predict the unknown location from where the query has been sent.

At step 430, a probability score is calculated for each potential location using the correlation scores. Generally, a probability is a mathematical likelihood that the unknown location of the user matches a potential location. The probability can be represented as $P(X|Y)$, where X is a location and Y is the query. A variety of techniques can be used to calculate the probabilities. In one embodiment, the correlations scores are summed. In another embodiment, the total number of potential locations is considered.

At step 440, the potential locations are ranked by probability scores. Ranking can be accomplished by sorting the probability column of a data table. In some embodiments, a threshold value is set before an estimated location is output. This prevents unreliable guesses. In other embodiments, a highest ranked score must be a threshold increment higher than the second ranked score. In still other embodiments, more than one location is output with associated probability scores. In other words, a country can be output with 100% (or a probability score of 1.0) certainty, while a city is output with 90% (or a probability score of 0.9) certainty and a province is also output with an 85% (or a probability score of 0.85) certainty.

At step 450, the estimated location is output as the identification of the unknown location. The location can be stored locally, sent to another application, or uploaded to a server.

For example, words from a query such as New York are considered, in addition to words baseball and champions. All the associated correlation scores are used to derive a probability score, and the highest ranked potential location may be Yankee Stadium where the New York Yankees baseball team plays. Thus, the output location would be Yankee Stadium as a predicated location of a query when compared to tweets sent from Yankee Stadium.

Figure 5:
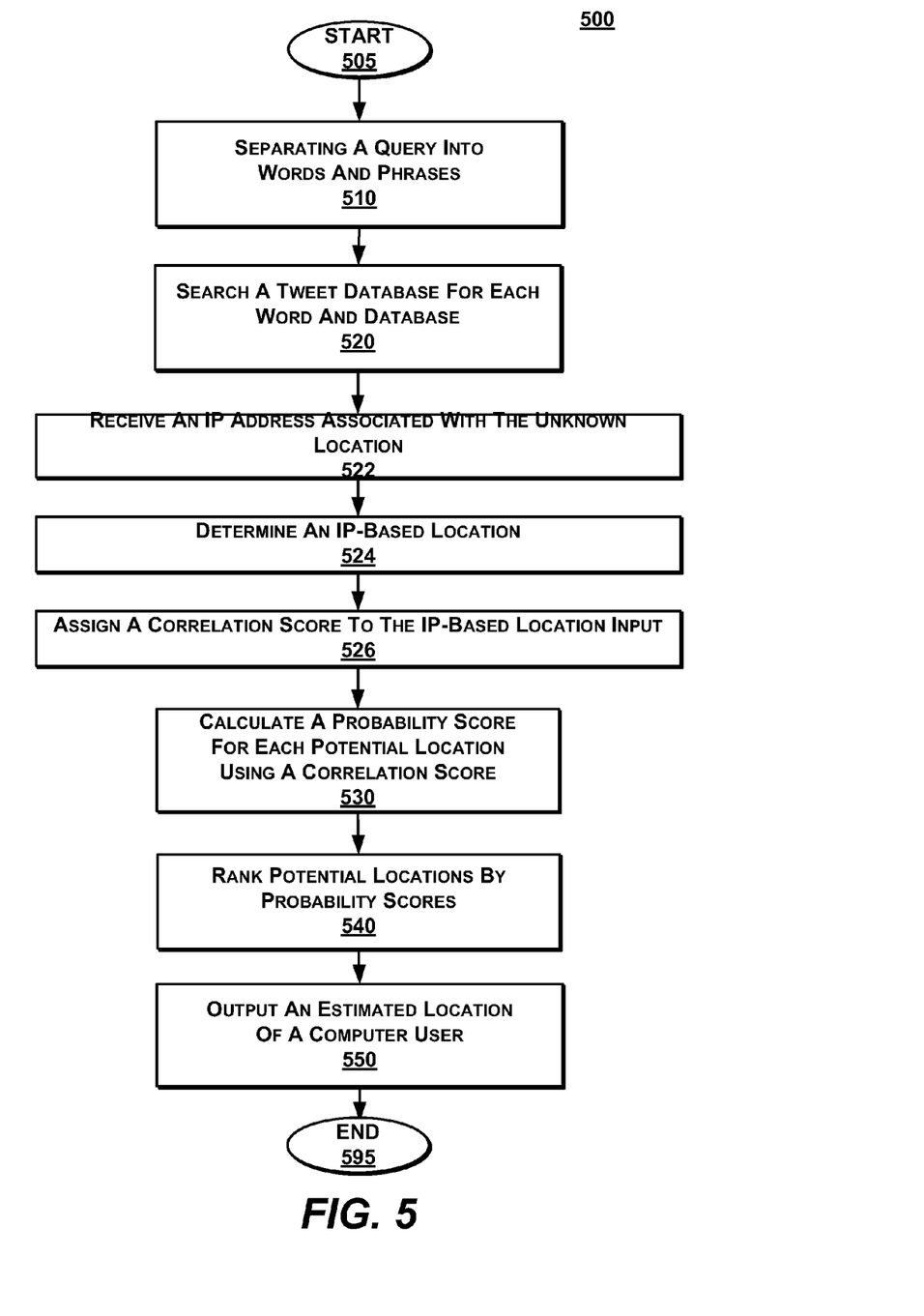
FIG. 5 is a flow chart illustrating use of a language model to improve location accuracy according to an embodiment.

FIG. 5 is a flow chart illustrating use of a language model to improve location accuracy. Relative to method 300 of FIG. 3, an IP-based location can be used as an additional input for estimating the location.

At step 522, an IP address associated with the unknown location is received. The IP address is a numerical label that is assigned to any device in a computer network that uses Internet Protocol for communication. In one implementation, the IP address is extracted from network packets received when transmitting the user query.

At step 524, IP-based location information is determined. In one embodiment, the IP address is compared to, for example, a table of known locations associated with IP addresses.

At step 526, a correlation score is assigned to the IP address input. The correlation score can be fixed to a predetermined correlation score. Alternatively, the correlation score can be determined by a reliability of the source.

At step 530, a probability score is calculated for each potential location using the correlation scores, which include the IP-based location as an input. In some cases, a robust query dominates the correlation score. In other cases, a short or location-vague query may not provide very much correlation value.

Figure 6:
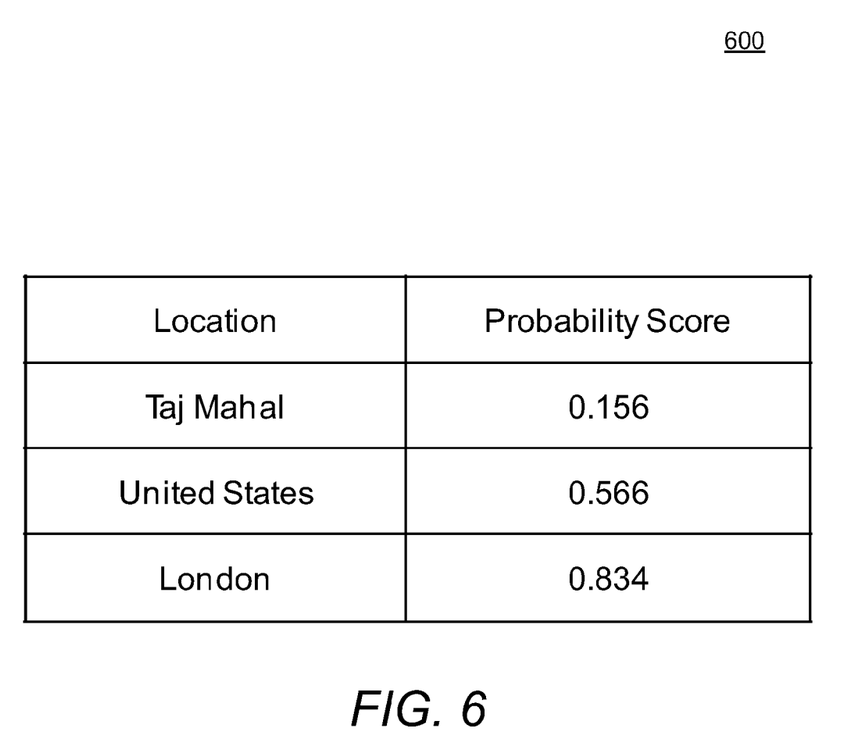
FIG. 6 is a table ranking potential locations associated with a query according to one embodiment of the present invention.

FIG. 6 is a table 600 ranking potential locations associated with a query according to one embodiment of the present invention.

The rows correspond to the common locations. The columns correspond to the probability score. The probability score is derived the frequency of terms in microblog content and represents the estimated likelihood that a user is located at a particular location. For example, the probability score can be defined as $P(X(i)|Y)$, where $X(i)$ is one of the common locations and Y is a query from a user at an unknown location. Thus, a score is calculated for each particular location given the query. The location having the highest probability score is selected as the predicted location.

Figure 7:
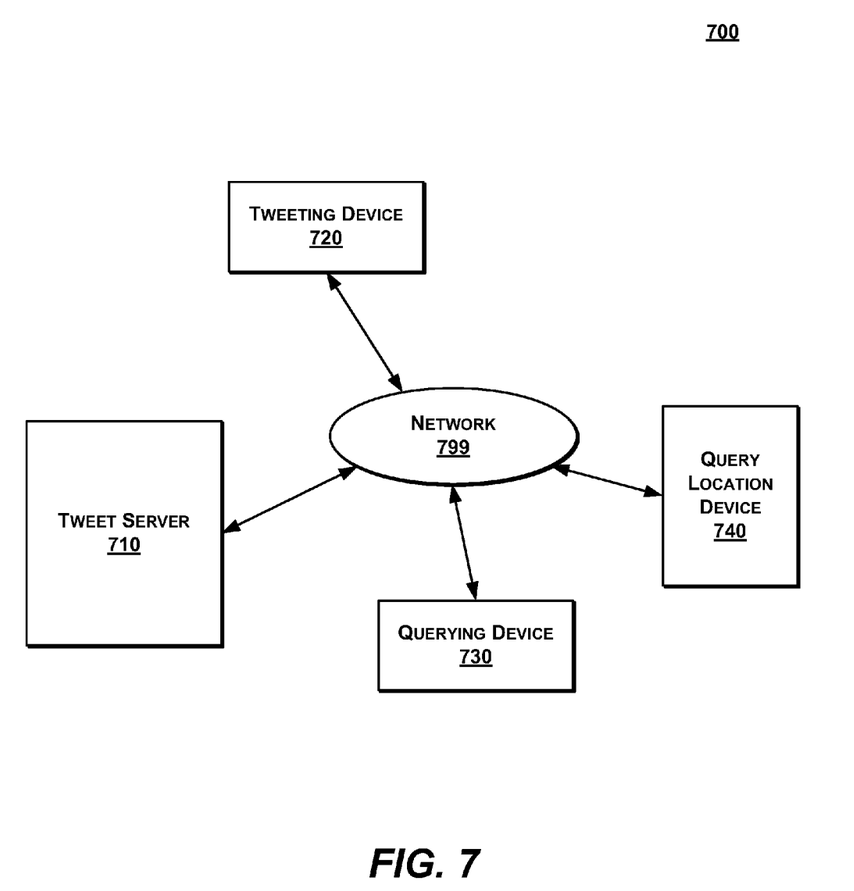
FIG. 7 is a block diagram of an exemplary computer system determining a location of the computer user using a language model according to one embodiment.

FIG. 7 is a block diagram of an exemplary computer system 700 determining a location of the computer user using a language model according to one embodiment. The system 700 can implement methods discussed above. The system 700 includes a tweet server 710, a tweeting device 720, a querying device 730, and a query location device 740, coupled in communication through a network 799 (e.g., the Internet or a cellular network).

The tweet server 710 can be, for example, a PC (Personal Computer), a laptop, a tweet blade, or any other computing device. In one embodiment the tweet server 710 can store web sites (e.g., http://www.twitter.com), web applications (e.g., twitter service), and databases (e.g., tweets sent by users). Responsive to requests from the tweeting device 720 and other clients, the tweet server 510 can register users for a tweet service, receive tweets from a user for distribution to followers, and/or post tweets on web pages.

The tweeting device 720 can be, for example, a PC, a stationary computing device, a laptop or notebook computer, a tablet computer, a smart phone or PDA, a smart appliance, or any other suitable processor-based device that can send tweets. In one embodiment, the tweeting device 720 send tweets with geotags to the tweet server 710. Additional embodiments of the tweeting device 720 are described in more detail below.

The querying device 730 can be any of the above processor-based devices. The querying device 730 can be stationary or mobile. When a user enters a query or other types of data string into a web browser 732 or other networked application, a location is determined, and location-based services can be provided.

The web browser 732 can be a desktop web browser (e.g., Internet Explorer, Mozilla, or Chrome), a mobile browser, or a web viewer built integrated into an application program. In an embodiment, a user accesses a system on the World Wide Web (WWW) through a network such as the Internet. The web browser 732 is used to download web pages or other content in various formats including HTML, XML, text, PDF, and postscript, and may be used to upload information to other parts of the system. The Web browser may use URLs (Uniform Resource Locators) to identify resources on the web and HTTP (HyperText Transfer Protocol) in transferring files on the web.

In some embodiments, a client is installed on the querying device 730 to capture queries. In other embodiments, the query location device 740 intercepts queries without the need for a client. For example, a user can log on to a web service such as Yahoo!. While using a search engine within Yahoo!, an trigger internal to the web service can capture the query for analysis.

The query location device 740 can be one or more of the above processor-based devices (e.g., a server bank). The query location device 740 derives a language model from tweets sent from various locations, as described herein. In one embodiment, the query location device 740 is pre-loaded with the language model.

Subsequently, when the querying device 730 sends a query, the query content is analyzed against a language model. Additional embodiments of the query location device 740 are described in more detail below.

Figure 8:
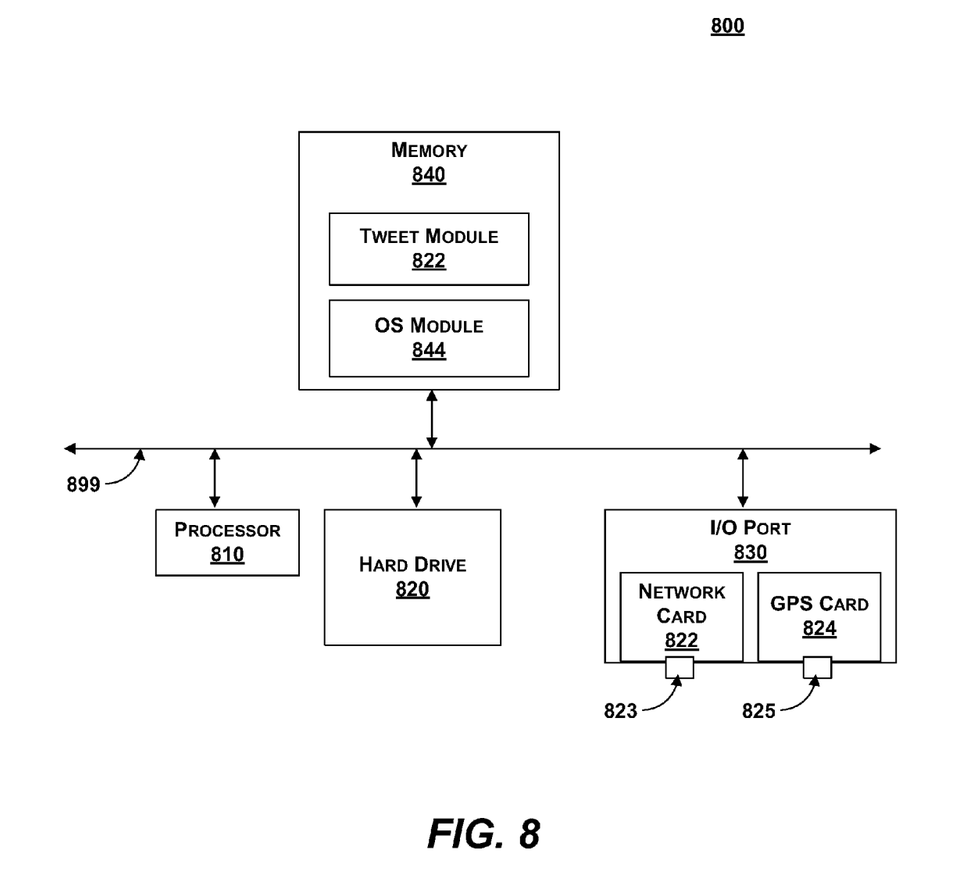
FIG. 8 is a block diagram of an exemplary tweeting device of the system according to one embodiment.

FIG. 8 is a block diagram of an exemplary tweeting device 800 of the system according to one embodiment. The tweeting device 800 is an exemplary implementation of the tweeting device 710 of FIG. 7. The tweeting device 800 includes a processor 810, a hard drive 820, an I/O port 830, and a memory 840 coupled by a bus 899. In one embodiment, the tweeting device 800 is a special device optimized for tweeting and social networking. In other embodiments, the tweeting device 800 is a general computing device.

The bus 899 can be soldered to one or more motherboards. The processor 810 can be a general-purpose processor, an application-specific integrated circuit (ASIC), an FPGA (Field Programmable Gate Array), a RISC (Reduced Instruction Set Controller) processor, an integrated circuit, or the like. There can be a single core, multiple cores, or more than one processor. In one embodiment, the processor 810 is specially suited for the processing demands of tweeting and social networking (e.g., custom micro-code, instruction fetching, pipelining or cache sizes). The processor 810 can be disposed on silicon or any other suitable material. In operation, the processor 810 can receive and execute instructions and data stored in the memory 840 or the hard drive 820. The hard drive 820 can be a platter-based storage device, a flash drive, an external drive, a persistent memory device, or any other type of memory.

The hard drive 820 provides persistent (i.e., long term) storage for instructions and data. The I/O port 820 is an input/output panel including a network card 822 and a GPS card 824. The network card 822 can be, for example, a wired networking card (e.g., a USB card, or an IEEE 802.3 card), a wireless networking card (e.g., an IEEE 802.11 card, or a Bluetooth card), a cellular networking card (e.g., a 3G card). An interface 823 is configured according to networking compatibility. For example, a wired networking card includes a physical port to plug in a cord, and a wireless networking card includes an antennae. The network card 822 provides access to a communication channel on a network. The GPS card 824 provides communication to GPS satellites operating space to receive location data. An antennae 825 provides radio communications (or alternatively, a data port can receive location information from a peripheral device).

The memory 840 can be a RAM (Random Access Memory), a flash memory, a non-persistent memory device, or any other device capable of storing program instructions being executed. The memory 840 further comprises a tweet module 842, and an OS (operating system) module 844. The tweet module comprises any type of tweet client or web browser used to send tweets with geotags. The OS module 844 can be one of the Microsoft Windows® family of operating systems (e.g., Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64.

Figure 9:
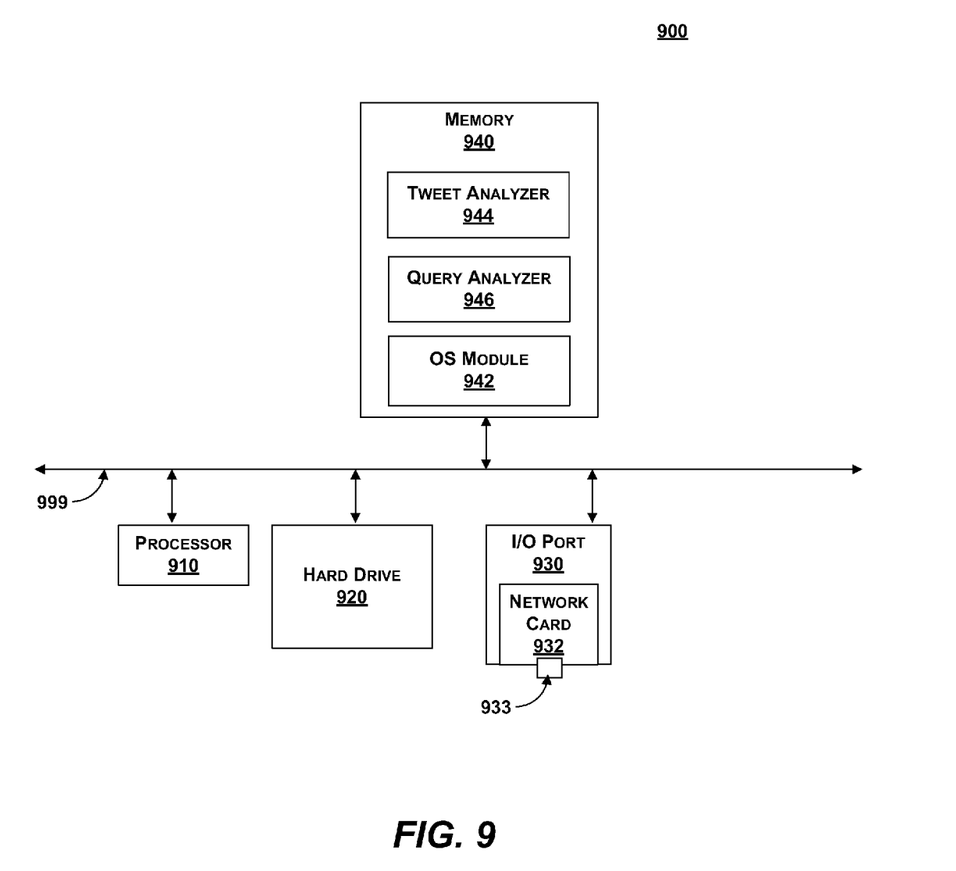
FIG. 9 is a block diagram of an exemplary query location device of the system according to one embodiment.

FIG. 9 is a block diagram of an exemplary query location device 900 of the system according to one embodiment. The query location device 900 is an exemplary implementation of the computing device 740 of FIG. 7.

The query location device 900 includes a processor 910, a hard drive 920, an I/O port 930, and a memory 940, coupled by a bus 999. The processor 910, the hard drive 920, and the I/O port 930 can be configured as described above with respect to FIG. 8. However, the hard drive 920 stores a language model, and the I/O port 830 can be implemented without a GPS module.

Figure 10:
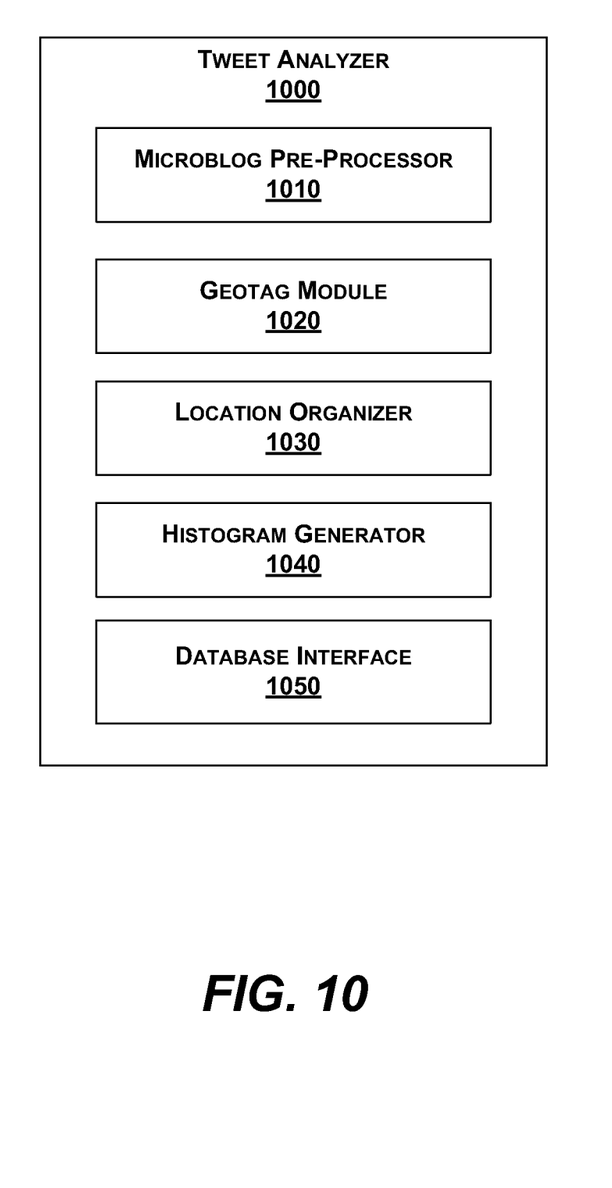
FIG. 10 is a block diagram of an exemplary tweet analyzer of the query location device according to one embodiment.

The memory 940 comprises an OS module 942, as described above, along with a tweet analyzer 944 and a query analyzer 946. The tweet analyzer 944 develops the language model (i.e., unless pre-configured). The query analyzer 946 determines a location from a received query. Both are described in more detail below FIG. 10 is a block diagram of an exemplary tweet analyzer 1000 according to one embodiment. The tweet analyzer 1000 is an exemplary implementation of the tweet analyzer 944 of FIG. 9.

The tweet analyzer 1000 includes a microblog pre-processor 1010, a geotag module 1020, a location organizer 1030, a histogram generator 1040, and a database interface 1050. The components can communicate with each other through, for example, APIs (Application Programming Interfaces). In other embodiments, all or parts of the components can be implemented in hardware or benefit from special hardware accelerators.

The microblog pre-processor 1010 prepares tweets for analysis. The geotags module 1020 extracts geotags from tweets. The location organizer 1030 sorts word and phrases per location. The histogram generator 1040 calculates a frequency of words and phrases at a particular location. The database interface 1050 stores the results in the hard drive 920 of FIG. 9.

Figure 11:
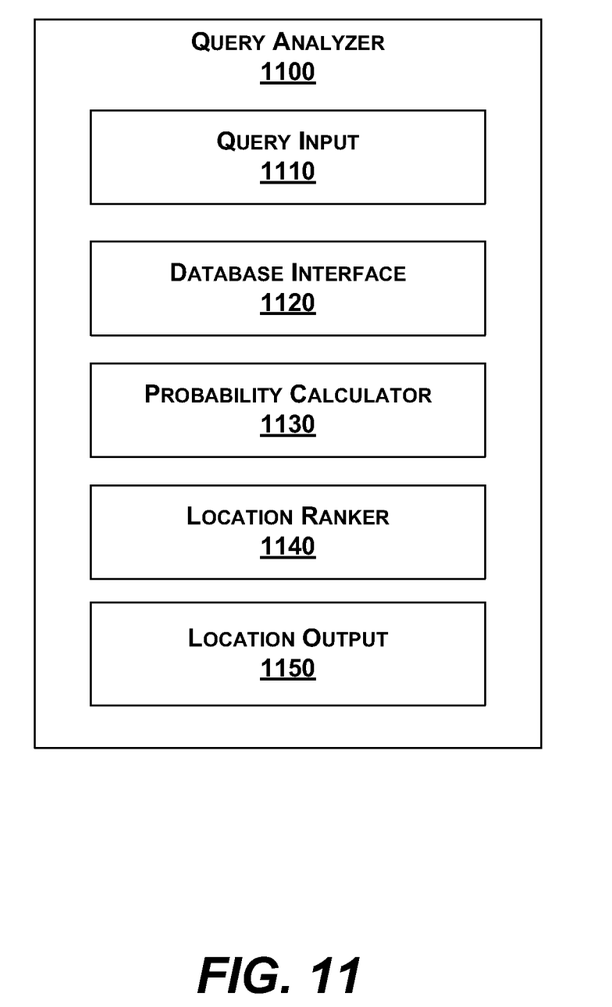
FIG. 11 is a block diagram of an exemplary query analyzer of the tweet server according to one embodiment

FIG. 11 is a block diagram of an exemplary query analyzer 1100 according to one embodiment. The query analyzer 1100 is an exemplary implementation of the query analyzer 946 of FIG. 9.

The query analyzer 1100 includes query input 1110, a database interface 1120, a probability calculator 1130, a location ranker 1140, and a location output 1150. The components can communicate with each other through, for example, APIs (Application Programming Interfaces). In other embodiments, all or parts of the components can be implemented in hardware or benefit from special hardware accelerators.

The query input 1110 communicates externally and receives a query form a user at an unknown location. The database interface 1120 searches the hard drive 920 of FIG. 9, the probability calculator 1130 calculates probabilities associated with search results, the location ranker 1140 ranks the potential locations according to the probability score, and the location output 1150 communicates externally to provide location-based services with a location of a user.

As described herein, computer software products may be written in any of various suitable programming languages, such as C, C++, C#, Pascal, Fortran, Perl, Matlab (from MathWorks), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems). Many of the functionalities described herein can be implemented in computer software, computer hardware, or a combination.

Furthermore, the computer that is running the previously mentioned computer software may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

It is to be understood that although various components are illustrated herein as separate entities, each illustrated component represents a collection of functionalities, which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A computer-implemented method for locating a user at an unknown location based on a language model derived from aggregated tweets sent from known locations, comprising:
    aggregating a plurality of tweets from a plurality of users at a plurality of known locations, each tweet comprising microblog content and a geotag with location coordinates of the tweet;
    grouping microblog content of tweets sent from a common location;
    receiving query content from a user at an unknown location;
    estimating the unknown location from the plurality of known locations by comparing at least a portion of the query content to the microblog content; and
    outputting the estimated location.

2. The method of claim 1, further comprising:
    building a histogram of word or phrase frequency for each common location.

3. The method of claim 1, wherein the receiving query content step occurs subsequent to the grouping microblog content step.

4. The method of claim 1, wherein the common location comprises at least one of a country, a state, city, a zip code, a neighborhood, a point of interest, a province, a grid location, or an arbitrary boundary.

5. The method of claim 1, wherein the location coordinates for a geotag comprises a longitude and latitude.

6. The method of claim 1, further comprising:
    receiving an IP address associated with the unknown location; and
    retrieving IP-based location information,
    wherein estimating the unknown location use the IP-based location as an input.

7. The method of claim 1, wherein the comparing the query content to the microblog content comprises:
    generating a list of common locations correlated to the query content; and
    ranking the list of common locations based on a probability score that tweet text of a common location matches the tweet text of an unknown location.

8. The method of claim 7, wherein the predicted certain common location is selected as a highest probability score.

9. The method of claim 1, further comprising:
    providing location-based information associated with the certain common location.

10. A computer program product stored on a non-transitory computer-readable medium that when executed by a processor, performs a method for locating a user based on tweets associated with a location, the method comprising:
    aggregating a plurality of tweets from a plurality of users at a plurality of known locations, each tweet comprising microblog content and a geotag with location coordinates of the tweet;
    grouping microblog content of tweets sent from a common location;
    receiving query content from a user at an unknown location;
    estimating the unknown location from the plurality of known locations by comparing at least a portion of the query content to the microblog content; and
    outputting the estimated location.

11. The product of claim 10, further comprising:
    building a histogram of word or phrase frequency for each common location.

12. The product of claim 11, wherein the predicted certain common location is selected as a highest probability score from a plurality of potential common locations.

13. The product of claim 10, wherein the receiving query content step occurs subsequent to the grouping microblog content step.

14. The product of claim 10, wherein the common location comprises at least one of a country, a state, city, a zip code, a neighborhood, a point of interest, a province, a grid location, or an arbitrary boundary.

15. The product of claim 10, wherein the location coordinates for a geotag comprises a longitude and latitude.

16. The product of claim 10, further comprising:
    receiving an IP address associated with the unknown location; and
    retrieving IP-based location information,
    wherein estimating the unknown location use the IP-based location as an input.

17. The product of claim 10, wherein the comparing the query content to the microblog content comprises:
    generating a list of common locations correlated to the query content; and
    ranking the list of common locations based on a probability score that a common location matches the unknown location.

18. A system for locating a user based on tweet content associated with a location, comprising:
    a tweet database;
    a tweet training module, coupled in communication with the tweet database, the aggregate a plurality of tweets from a plurality of users at a plurality of known locations, each tweet comprising microblog content and a geotag with location coordinates of the tweet, the tweet training module grouping microblog content of tweets sent from a common location and storing in the tweet database;
    a tweet query module, coupled in communication with the tweet database, the tweet query module to receive query content from a user at an unknown location, the tweet query estimating the unknown location by comparing at least a portion of the query content to the microblog content, and outputting the estimated location from the tweet database.

19. The system of claim 18, wherein the common location comprises at least one of a country, a state, a city, a zip code, a neighborhood, a point of interest, a province, a grid location, or an arbitrary boundary.

20. The system of claim 18, wherein the tweet query module receives an IP address associated with the unknown location, and retrieves IP-based location information to estimate the unknown location using the IP-based location as an input.

* * * * *